May 24, 1938.   G. SLAYTER   2,118,271
AIR FILTER ENVELOPE
Original Filed April 10, 1933   3 Sheets-Sheet 1
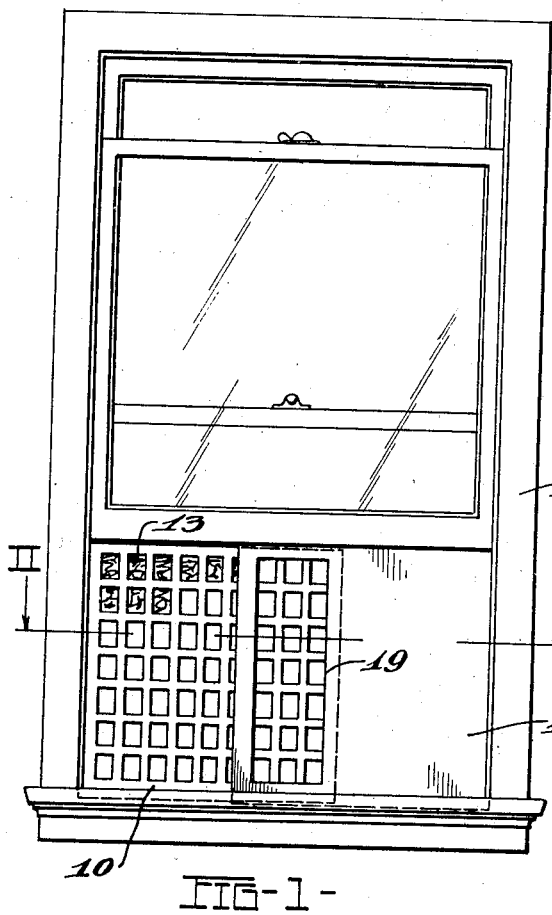
FIG-1-
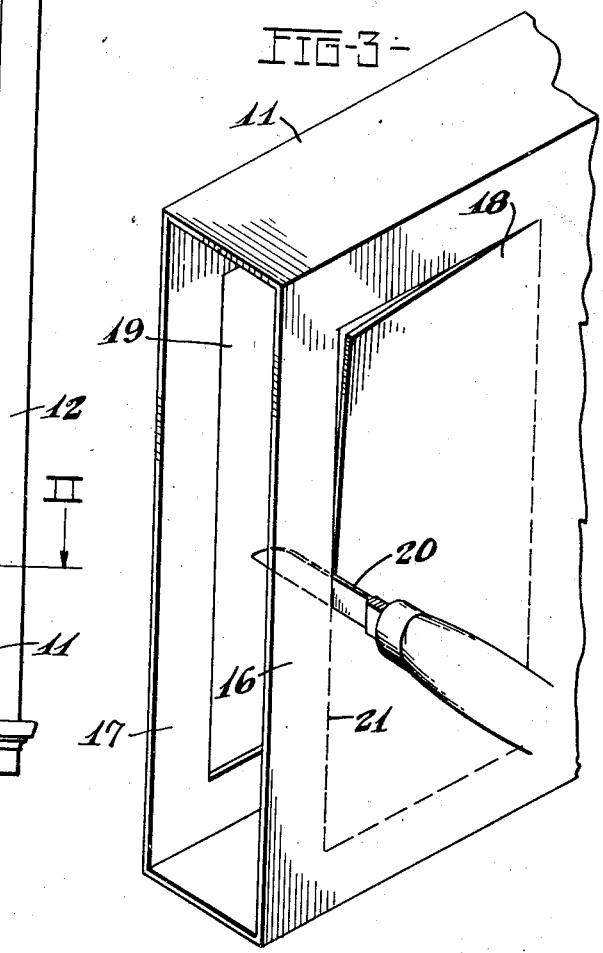
FIG-3-
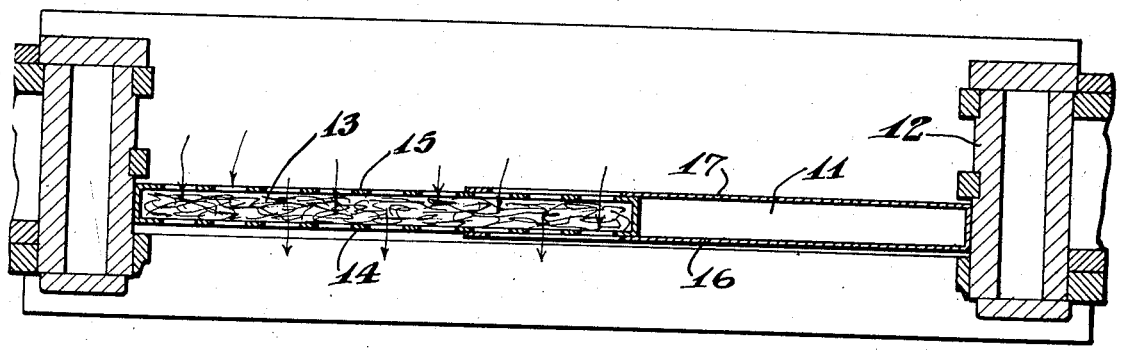
FIG-2-
Inventor
James Slayter
By
J. F. Rule
Attorney May 24, 1938. G. SLAYTER 2,118,271
AIR FILTER ENVELOPE
Original Filed April 10, 1933    3 Sheets-Sheet 2
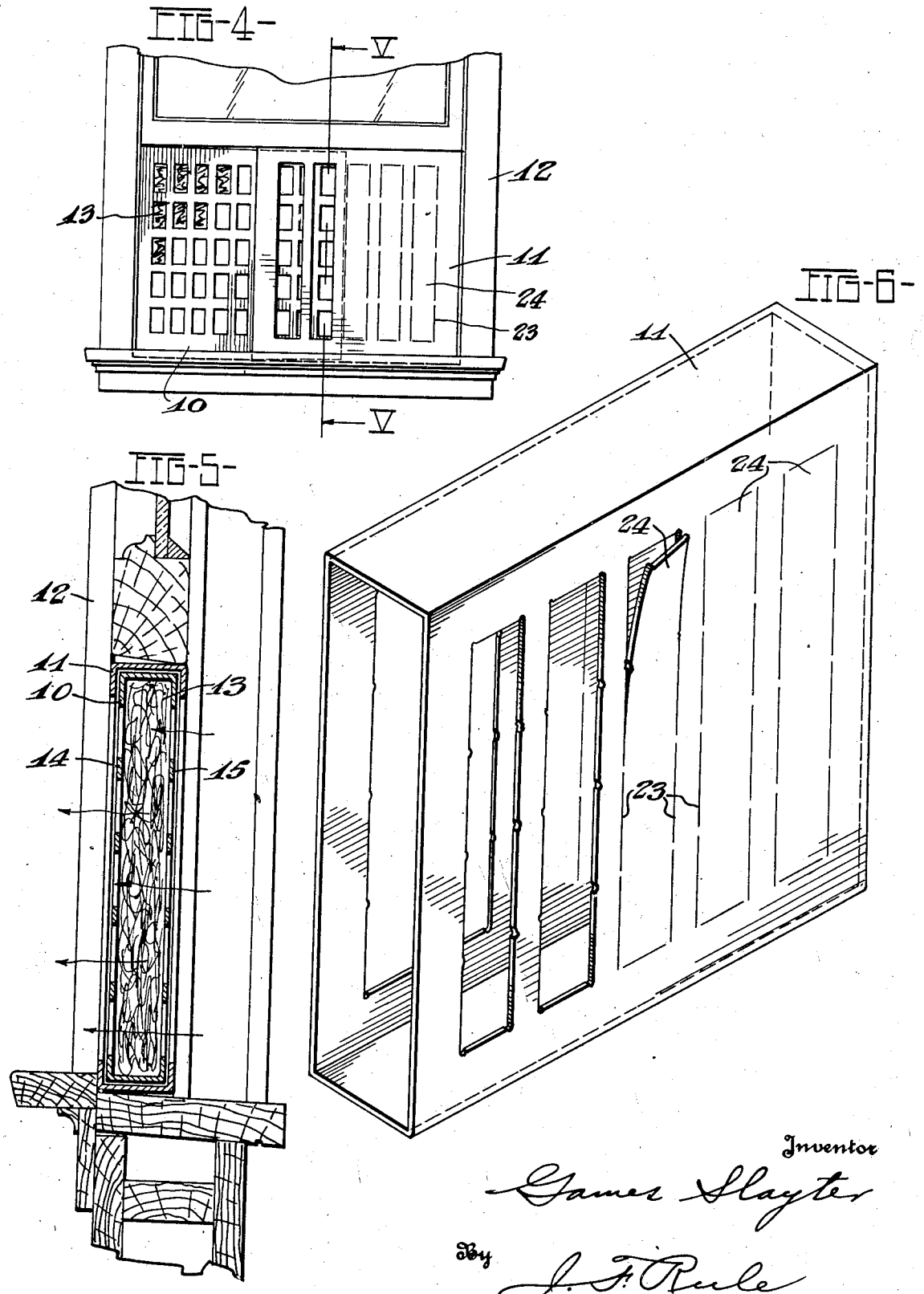
Inventor
James Slayter
By J. F. Rule
Attorney May 24, 1938.  G. SLAYTER  2,118,271
AIR FILTER ENVELOPE
Original Filed April 10, 1933    3 Sheets-Sheet 3
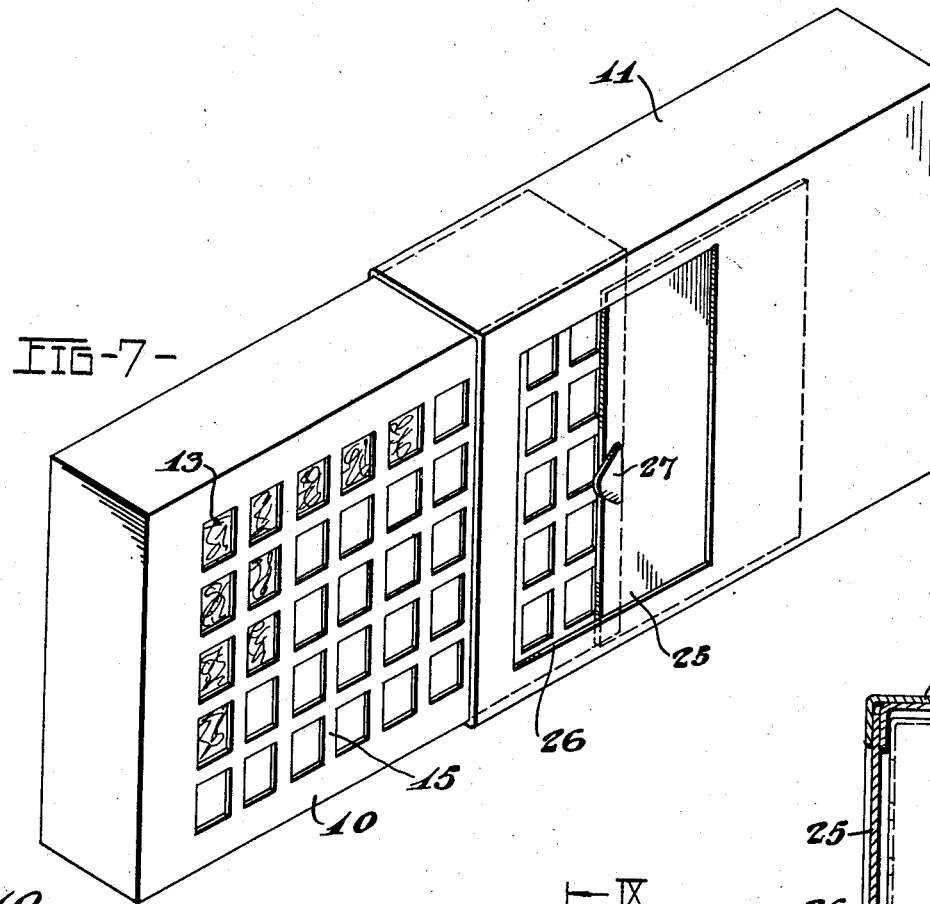
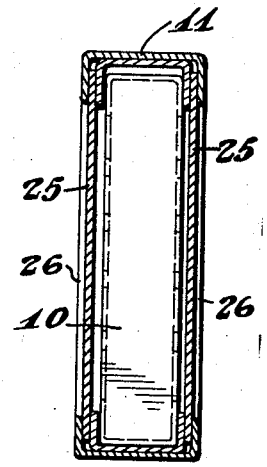
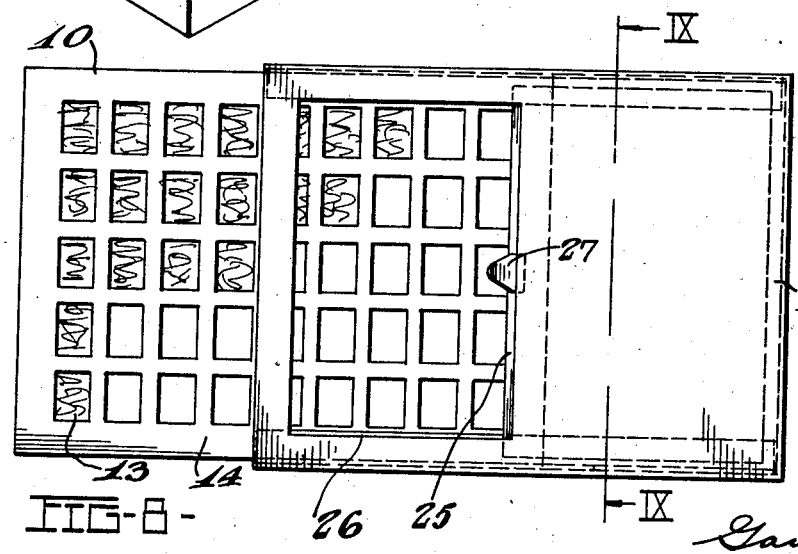
Inventor
James Slayter
By J. F. Rule
Attorney Patented May 24, 1938

2,118,271

UNITED STATES PATENT OFFICE 2,118,271

AIR FILTER ENVELOPE

Games Slayter, Newark, Ohio, assignor to Owens-Illinois Glass Company, a corporation of Ohio Application April 10, 1933, Serial No. 665,261
Renewed October 14, 1937

3 Claims. (Cl. 98—99)

My invention relates to air filters and accessories. More particularly, the invention comprises an envelope or holder for a filter unit, adjustable in a manner to adapt the filter unit for windows or other openings of different dimensions. An object of the invention is to provide a device of the character indicated, which is very simple in construction, inexpensive to manufacture, and which permits a filter unit to be quickly adjusted to a window or the like of any width within a predetermined range.

Other objects of the invention will appear hereinafter.

In the accompanying drawings:

Fig. 1 is an elevation view of a window with an air filter unit and envelope installed therein.

Fig. 2 is a sectional plan on a larger scale, the section being taken at the line II—II on Fig. 1.

Fig. 3 is a fragmentary perspective view of the envelope, indicating the method of removing a section therefrom.

Fig. 4 is a view similar to Fig. 1, showing a modified form of envelope.

Fig. 5 is a section at the line V—V on Fig. 4.

Fig. 6 is a perspective view of the envelope shown in Figs. 4 and 5.

Fig. 7 is a perspective view of a filter unit and envelope with a separate panel for adjustment.

Fig. 8 is an elevation of the same, but with a different adjustment of the parts.

Fig. 9 is a section at the line IX—IX on Fig. 8.

Referring particularly to Figs. 1, 2 and 3, an air filter 10 is combined with an adjusting device herein shown as an envelope or casing 11 telescopically connected with the filter to provide an adjustable unit installed in a window 12. The air filter unit 10 may be of any conventional or approved construction and, as herein shown, comprises filtering material 13 such, for example, as glass wool treated with an oily substance to which dust will adhere, and a rectangular enclosing casing including front and rear walls 14 and 15 comprising openwork permitting the free passage of air.

The envelope 11 is also of rectangular construction and may be made of any approved sheet material such as heavy paper, paper-board, cardboard, or a thin sheet metal. The envelope is made of a size and shape to telescope with the filter unit 10. The front and rear walls 16 and 17, respectively, are preferably imperforate. The telescopic connection of the filter unit and envelope permit adjustment to adapt them to windows or other apertures of different widths. When the unit has been adjusted, for example, to the window 12, sections or panels 18 are cut out from the front and rear walls 16 and 17 of the envelope to leave openings 19 opposite that portion of the filter which extends into the envelope, thus exposing practically the entire area of the filter. This permits the filter to operate to its full capacity.

As indicated in Fig. 3, the panels 18 may be cut out by means of a knife 20 or other implement. If desired, the envelope may be provided with markings or other means 21 which may consist of slits, perforations, or the like, which define the margins of the removable panels and facilitate their removal. It will be understood, however, that the panels may be removed without the aid of the weakened portions 21. Ordinarily, when the unit has been fitted or adjusted to a window or the like, the size and location of the panels or sections 18 to be removed can readily be determined. It will be seen that in combination with the envelope 11, the filter 10 may be fitted either into a comparatively narrow window or opening or can be adjusted to a wider opening. Then by cutting out panels 18 of a width corresponding to the overlap of the filter and envelope, which overlap is determined by the width of the window into which the filter is fitted, practically the full area of the filter may be exposed, so that the entire filter is effectively utilized.

Figs. 4 to 6 illustrate a modification in which the envelope 11 is provided with scores or weakened portions 23 along the edges of removable sections or panels 24, enabling any desired number of said panels to be readily removed. The weakened portions 23 may be either in the form of slits extending entirely through or only partially through the wall of the envelope, or any other approved means may be used to facilitate the removal of the panels 24. As shown in Fig. 4, a filter and its envelope have been installed in a window of such width that it has been necessary to remove two of the panles 24 from each side of the envelope to expose the full area of the filter. For a wider window, evidently a less number of panels would be removed, and for a narrower window it would be necessary to remove a greater number to completely expose the filter.

Referring to Figs. 7 to 9, I have shown adjustable plates or panels 25 for use in combination with an air filter and envelope. The envelope is in this instance formed with rectangular openings 26. The panels 25 which are slidable lengthwise of the envelope provide means for adjusting the effective area of the openings 26 to correspond to the position of the filter within the envelope when adjusted in a window or other opening. The panels 25 may be formed with finger tabs 27 which provide a convenient means for grasping and sliding the panels. Two panels may be provided as shown in Fig. 9, positioned between the filter unit and the front and rear walls, respectively, of the envelope. If preferred, a single panel may be used.

It will be seen that with this construction the filter may be adjusted to a comparatively narrow window and later transferred and adjusted to a wider window or vice versa. Also, such adjustment is made without requiring the removal of sections of the envelope.

Modifications may be resorted to within the spirit and scope of my invention.

What I claim is:

1. The combination of a rectangular filter unit, an envelope slidably connected with said unit to form an extension by which the filter unit may be adjusted to openings of different dimensions, said envelope having an opening therein to expose a portion of the filter, the area of said exposed portion being variable with the adjustment of the envelope, and a panel adjustable to cover a portion of said opening determined by the adjustment of the envelope.

2. The combination of a filter unit, an adjusting device slidably connected with and overlapping the filter, said device formed with an opening therein to expose a portion of the filter, and a panel slidably connected to said adjusting device and covering a variable portion of said opening.

3. The combination of a rectangular filter unit, an envelope slidably connected with said unit to form an extension by which the filter unit may be adjusted to openings of different dimensions, said envelope having openings in its front and rear faces to expose a portion of the filter, the area of said exposed portion being variable with the adjustment of the envelope, and panels adjustable to cover portions of said openings determined by the adjustment of the envelope.

GAMES SLAYTER.